Sept. 7, 1954  F. S. THOMAS, JR  2,688,390
CENTRIFUGAL CLUTCH WITH VIBRATION DAMPENER
Filed May 1, 1948  2 Sheets-Sheet 2
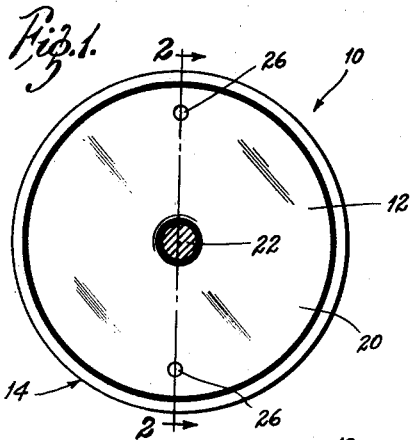
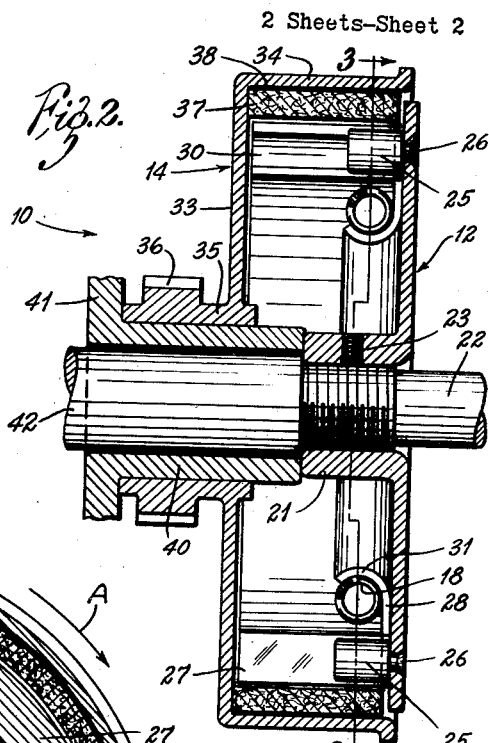
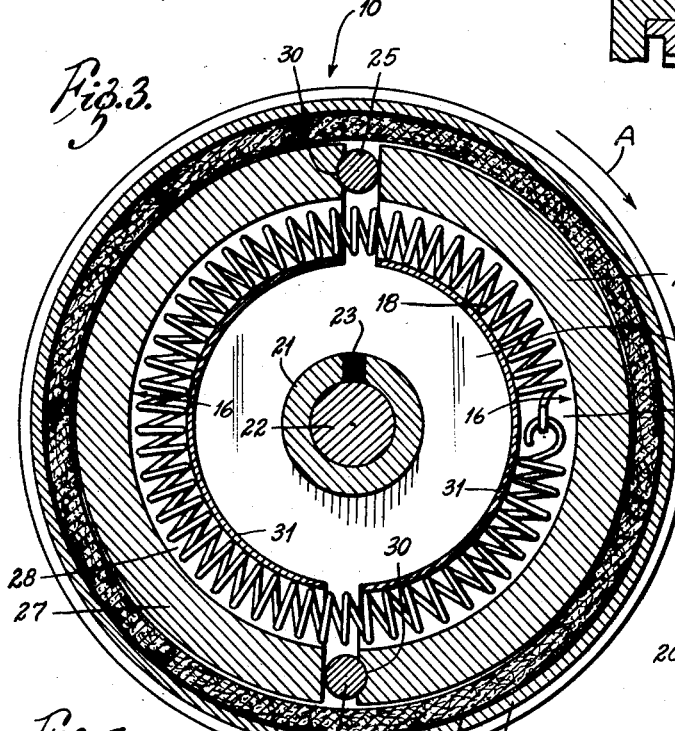
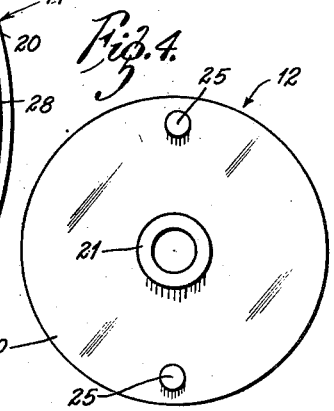
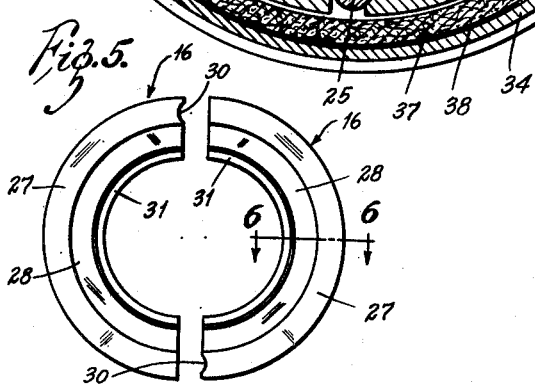
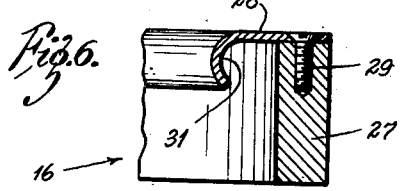
INVENTOR:
FRANK S. THOMAS, JR.
BY Rogers & Ezell,
ATTORNEYS.

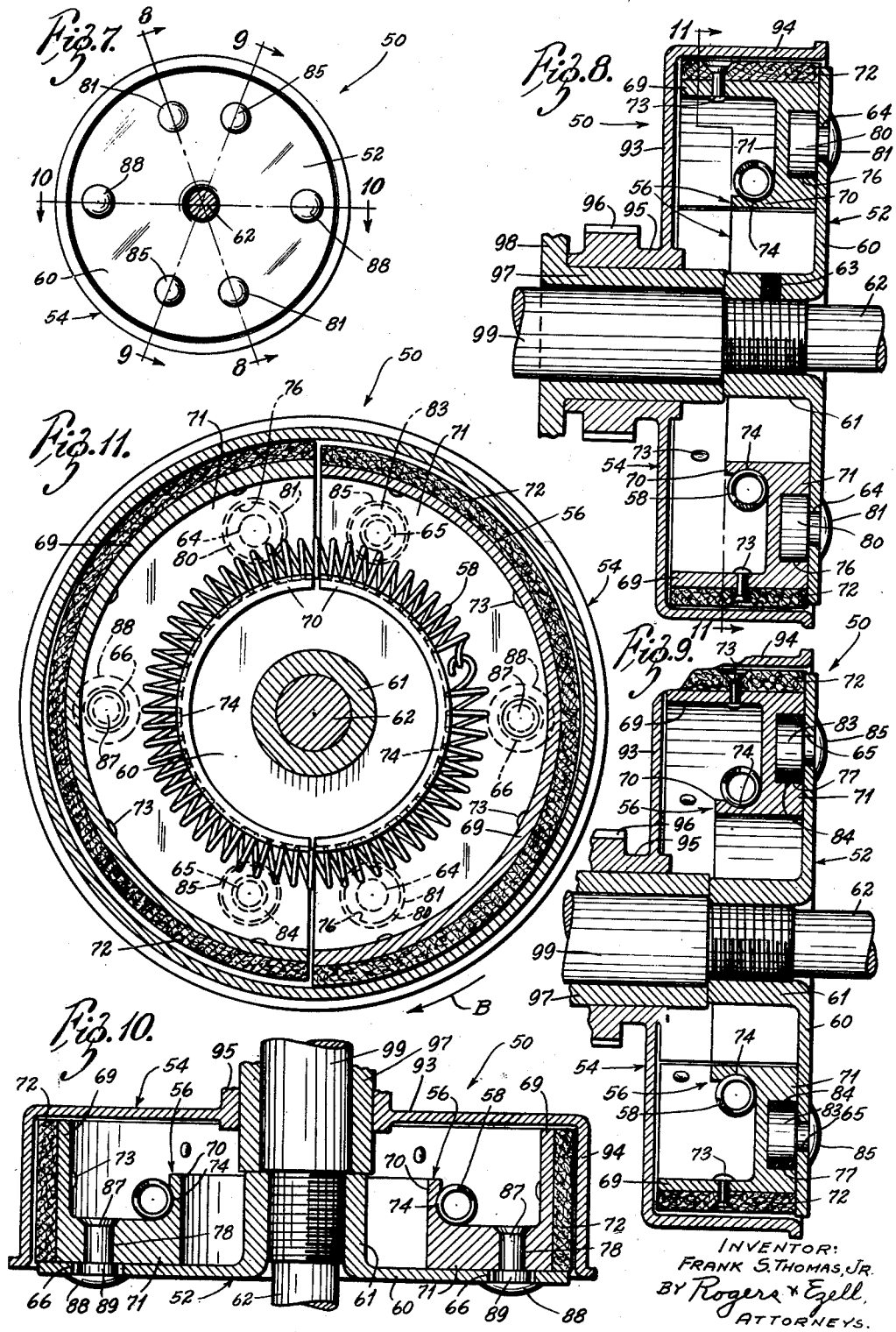

Patented Sept. 7, 1954

2,688,390

UNITED STATES PATENT OFFICE 2,688,390

CENTRIFUGAL CLUTCH WITH VIBRATION DAMPENER

Frank S. Thomas, Jr., St. Louis, Mo., assignor to Development Corporation, Inc., St. Louis, Mo., a corporation of Missouri Application May 1, 1948, Serial No. 24,581

4 Claims. (Cl. 192—105)

The present invention relates generally to clutch constructions, and more particularly to a centrifugal clutch.

An object of the present invention is to provide a novel centrifugal clutch in which there is substantial contact between bodily movable driving elements and the driven element.

Another object is to provide a novel centrifugal clutch in which centrifugally movable elements are moved into engagement with a driven member for driving engagement thereof at a predetermined speed of rotation, and in which there is a transition period preceding engagement to substantially eliminate shock.

Another object is to provide a novel centrifugal clutch which is spring restrained in its inactive position.

Other objects are to provide a novel centrifugal clutch which is simple in construction, which is efficient in its driving action, which is of rugged construction so that it functions over a long period of time with a minimum amount of maintenance, which is formed for ready replacement of the lining of the driving or driven element, which is relatively inexpensive, and which is adapted to a wide range of application.

The foregoing and other objects and advantages are apparent from the following description taken with the accompanying drawings, in which:

Fig. 1 is a side elevational view of one clutch incorporating the teachings of the present invention, looking toward the outer face of the driving member;

Fig. 2 is an enlarged cross-sectional view on substantially the line 2—2 of Fig. 1;

Fig. 3 is a cross-sectional view on substantially the line 3—3 of Fig. 2;

Fig. 4 is a view of the driving member;

Fig. 5 is a view of the centrifugally movable elements;

Fig. 6 is an enlarged cross-sectional view on substantially the line 6—6 of Fig. 5;

Fig. 7 is a side elevational view similar to Fig. 1 of another clutch construction incorporating the teachings of the present invention;

Fig. 8 is an enlarged cross-sectional view on substantially the line 8—8 of Fig. 7;

Fig. 9 is an enlarged cross-sectional view on substantially the line 9—9 of Fig. 7;

Fig. 10 is an enlarged cross-sectional view on substantially the line 10—10 of Fig. 7; and Fig. 11 is a cross-sectional view on substantially the line 11—11 of Fig. 8.

Referring to the drawings more particularly by reference numerals, one modification is shown in Figs. 1-6 in which 10 indicates generally a clutch incorporating the principles of the present invention. Broadly, the clutch 10 includes a driving member 12, a driven member 14, two centrifugally movable shoe elements 16, a spring 18, and connecting elements.

The driving member 12 comprises a disc or plate 20 having a centrally located internally threaded hub 21 which threadedly receives a drive shaft 22. A suitable setscrew 23 or the like maintains the driving member 12 in position on the drive shaft 22. Diametrically opposed pins or posts 25 are secured to the disc 20 near the outer edge thereof by peened over integral necks 26.

Each of the shoe elements 16 is of arcuate form, as is clear from the drawings, and includes an arcuate engaging wall 27 secured to an arcuate spring receiving member 28 by suitable screws 29. As is clear from Figs. 2 and 6, the member 28 is of $j$ cross section radially to include a spring receiving trough 31. The two shoe elements 16 are disposed on the disc 20 with the spring 18 in the troughs 31 drawing them against the posts 25, each arcuate wall having an arcuate indentation 30 at one end for registration with the respective post 25.

The driven member 14 is of cup-shape and includes a base 33 and an annular flange 34. A hub 35 is formed integral with the base 33 centrally thereof and includes an integral gear 36. A lining 37 is secured to the interior surface of the flange 34 by cement 38 or the like. It is unnecessary to employ rivets or other such mechanical devices for securing the lining 37 to the driven member 14. As shown, the driven member 14 has bearing support on a sleeve 40, which may be formed integral with a member 41 and which may surround a portion 42 of the drive shaft 22.

In operation, when power is applied to the drive shaft 22, the driving member 12 and its associated shoe elements 16 through the posts 25 will be driven in the direction of the arrow A (Fig. 3). As the speed of rotation increases to a predetermined point, such as 1200 R. P. M. by way of example, the shoe elements 16 will move outwardly against the force of the spring 18 into engagement with the lining 37. There is a transition period, since manifestly the shoe elements 16 will not instantly move from the positions of Fig. 3 against the force of the spring 18 into driving engagement with the lining 37. Hence, the clutching action will be gradual and full driving engagement will result at 1400 R. P. M., for example. As the speed of the drive shaft 22 is further increased, the driven member 14 will be rotated therewith at the same R. P. M. If the driven gear 36 is connected to the wheel of a bicycle or the like, the bicycle will be moved in accordance with the speed of rotation of the drive shaft 22.

As the speed of rotation of the drive shaft 22 drops below 1400 R. P. M., there will be disengagement of the shoe elements 16 with the lining 37, and, as the speed of rotation drops below 1200 R. P. M., the spring 18 will return the shoe elements 16 to their positions of Fig. 3. The arcuate indentations 30 center the shoe elements 16 so that there is clearance between them and the lining 37. It is, of course, to be understood that the clearance between the shoe elements 16 and the lining 37 is very small, for example .01", so that when the shoe elements 16 move against the lining 37 there is substantially full engagement therewith. Since the outer face of the shoe elements 16 and the inner face of the lining 37 are concentric, there will be a slightly less engaging pressure toward the ends of the shoe elements 16, but this is of no material consequence.

It is clear that the shoe elements 16 move radially bodily into engagement with the lining 37, and do not pivot outwardly under the centrifugal force. This results in the substantially full engagement of the shoe elements 16 with the lining 37, which cannot be obtained by pivoted shoes.

It is, of course, manifest that the particular arrangement of the driving member 12 and the driven member 14 may be modified from the arrangment shown to accommodate adaptations of the clutch 10. For example, the driven gear 36 may be eliminated, and a sheave applied to the driven member 14 and to the right of the driving member 12, as viewed in Fig. 2.

In Figs. 7 through 11 is disclosed another clutch construction 50 incorporating the concepts of the present invention. As in the first described clutch 10, the clutch construction 50 broadly includes a driving member 52, a driven member 54, two centrifugally movable shoe elements 56, a spring 58, and associated connecting elements. The driving member 52 comprises a disc or plate 60 having a centrally located internally threaded hub 61 which threadedly receives a reduced portion of a drive shaft 62, a suitable setscrew 63, or the like, maintaining the driving member 52 in position on the drive shaft 62. The plate 60 includes three pairs of diametrically opposed apertures 64, 65 and 66 (Figs. 8, 9 and 10, respectively).

Each of the shoe elements 56 is of arcuate form, as is clear from the drawings, and is generally of modified U transverse cross section including an outer arcuate wall 69, an inner arcuate wall 70, and a base 71. To each outer wall 69 is secured a lining 72 of suitable braking or friction material by means of rivets 73, or the like. Each inner wall 70 has an internal groove 74, which together form a circular groove receiving the spring 58. In each base 71 are two wells 76 and 77 and an aperture 78 (Figs. 8, 9 and 10, respectively) which are disposed for alignment with the apertures 64, 65 and 66 in the driving member 52. It is to be noted that the apertures 64 and 65 are of much smaller diameter than their opposed wells 76 and 77, and that the apertures 66 are of greater diameter than their opposed apertures 78. A steel stud 80 is disposed in and fills each well 76 and has a reduced neck extending through the aperture 64 and peened over to form a head 81, thereby anchoring each shoe 56 and forming a pivot point therefor. In each well 77 is a steel stud 83 of less diameter than the well 77 about which is disposed a resilient collar 84 of neoprene, or the like. Each stud 83 has a reduced neck extending through the respective apertures 65 and peened over to form a head 85. A steel stud 87 is anchored in each aperture 78, as shown, and includes an enlarged head 88 disposed against the outer surface of the driving member 52. The stud 87 has a neck 89 of less diameter than the aperture 66 to permit relative movement between the shoe elements 56 and the driving member 52.

The driven member 54 is of cup-shape and includes a base 93 and an annular flange 94. A hub 95 is formed integral with the base 93 centrally thereof and includes an integral gear 96. As illustrated, the driven member 54 has bearing support on a sleeve 97 which may be formed integral with a member 98 and which may surround a portion 99 of the drive shaft 62.

In forming the shoes 56, the outer convex surface of the outer wall 69 is turned down on a machine so that the radius thereof closely approaches that of the flange 94 of the driven member 54 when in clutching position. This is done so that there will be substantially full contact between the conformed lining 72 and the flange 94 during clutching action.

In operation, when power is applied to the drive shaft 62, the driving member 52 and its associated shoe elements 56, through the studs 80, will be driven in the direction of the arrow B (Fig. 11). As the speed of rotation increases to a predetermined point, such as 1200 R. P. M. by way of example, the shoe elements 56 will move outwardly against the force of the spring 58 to move the lining 72 into engagement with the flange 94 of the driven member 54. There is a transition period, since, manifestly, the shoe elements 56 will not instantly move from the positions of Fig. 11 against the force of the spring 58. Hence, the clutching action will be gradual and full driving engagement will result at about 1400 R. P. M., for example. As the speed of the drive shaft 62 is further increased, the driven member 54 will be rotated therewith at substantially the same R. P. M. through the engagement therewith of the lining 72 of the driving member 52. If the driven gear 96 is connected to the wheel of a bicycle, or the like, the bicycle will be moved in accordance with the speed of rotation of the drive shaft 62.

It is to be noted here that the resilient collars 84 disposed about the studs 83 yield to permit the shoe elements 56 to pivot about the studs 80 as the drive shaft 62 reaches a predetermined speed of rotation. The collars 84 prevent a chattering action which may occur in their absence when the present clutch construction 50 is employed with a one-cylinder motor. It is well known that the driving action of a one-cylinder motor is not a constant speed, especially at low throttle, and, hence, the 1200 R. P. M. above referred to is actually an average speed. Chattering may result as the speed of the drive shaft 62 approaches the full engagement rotational speed of 1400 R. P. M. The collars 84 snub or absorb this chattering effect and insure smooth engagement of the lining 72 with the flange 94. The studs 87, of course, permit relative movement between the shoe elements 56 and the driving member 52 as aforesaid.

As the speed of rotation of the drive shaft 62 drops below 1400 R. P. M., there will be disengagement of the shoe elements 56 and their lining 72 with the flange 94, and, as the speed of rotation drops below 1200 R. P. M, the spring 58 will return the shoe elements 56 to their positions of Fig. 11. It is, of course, to be understood that the clearance between the lining 72 and the flange 94 is very small, for example .01", so that, when the lining 72 is moved against the flange 94, there is substantially full engagement therewith. Since the convex faces of the shoe elements 56 and the conformed lining 72 are of nearly the same radius as the concave surface of the flange 94, there will be substantially full engagement of the lining 72 with the flange 94, although necessarily there will be less engaging movement in that small area ahead of each stud 80.

As is the case in respect to the clutch 10, it is manifest that the particular arrangement of the driving member 52 and the driven member 54 may be modified from the arrangement shown to accommodate adaptations of the clutch 50.

It is apparent that there has been provided a novel clutch construction which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention, which is limited only by the claims which follow.

What is claimed is:

1. Centrifugally actuated clutch construction comprising a driving member, a driven member, means for driving the latter by the former including elements pivotally connected to said driving member and engageable with said driven member under centrifugal force, means biasing said elements out of engagement with said driven member, and means for damping vibration shock between said elements and said driven member due to variations in speed of the driven member as clutching speed is being reached thereby, including a stud having a resilient collar therearound secured to said driving member and snugly extending into a well in each element at a point spaced from the pivot point thereof.

2. Centrifugally actuated clutch construction comprising a driving member, a driven member, means for driving the latter by the former including elements pivotally connected by non-resilient means to said driving member so as to receive substantially tangential rotational impetus therefrom and engageable with said driven member under centrifugal force, means biasing said elements out of engagement with said driven member including an annular spring engaging all of said elements, and means for damping vibration shock between said elements and said driven member due to variations in speed of the driven member as clutching speed is being reached thereby.

3. Centrifugally actuated clutch construction comprising a driving member, a driven member, means for driving the latter by the former including elements pivotally connected by non-resilient means to said driving member so as to receive substantially tangential rotational impetus therefrom and engageable with said driven member under centrifugal force, means biasing said elements out of engagement with said driven member including an annular spring engaging all of said elements, and means for damping vibration shock between said elements and said driven member due to variations in speed of the driven member as clutching speed is being reached thereby, including a resilient member anchored to said driving member and engaging each of said elements, said resilient members resisting movement of said elements through centrifugal force, but yielding thereto.

4. Centrifugally actuated clutch construction comprising a driving member, a driven member, means for driving the latter by the former including elements pivotally connected to said driving member and engageable with said driven member under centrifugal force, means biasing said elements out of engagement with said driven member including an annular spring engaging all of said elements, and means for damping vibration shock between said elements and said driven member due to variations in speed of the driven member as clutching speed is being reached thereby, including a stud having a resilient collar therearound secured to said driving member and snugly extending into a well in each element at a point spaced from the pivot point thereof.

References Cited in the file of this patent

UNITED STATES PATENTS

| Number | Name | Date |
|---|---|---|
| 1,841,612 | Leyner | Jan. 19, 1932 |
| 2,000,713 | Norris | May 7, 1935 |
| 2,375,909 | Fawick | May 15, 1945 |
| 2,504,177 | Bruestle | Apr. 18, 1950 |
| 2,534,426 | Eason | Dec. 19, 1950 |

FOREIGN PATENTS

| Number | Country | Date |
|---|---|---|
| 410,252 | Great Britain | May 17, 1934 |
| 518,827 | Germany | Feb. 20, 1931 |
| 609,550 | Great Britain | Oct. 4, 1948 |
| 767,258 | France | July 13, 1934 |